May 24, 1966  H. E. ROEDTER  3,252,354
MULTIPLE SPEED POWER TRANSMISSION
Filed Oct. 22, 1962  2 Sheets-Sheet 2

INVENTOR.
HENRY E. ROEDTER
BY Toulmin & Toulmin
ATTORNEYS

United States Patent Office 3,252,354
Patented May 24, 1966

3,252,354
MULTIPLE SPEED POWER TRANSMISSION
Henry E. Roedter, 538 Clinton Springs Ave.,
Cincinnati 17, Ohio
Filed Oct. 22, 1962, Ser. No. 231,918
1 Claim. (Cl. 74—766)

This invention relates to a multiple speed power transmission.

Gear transmissions are, of course, well known and are widely used. In many cases, a plurality of speeds may be desired differing one from the other by only a small amount. This might be desired, for example, in spindle drives or in like situations. The usual gear transmission when employed in a situation of this nature is generally quite large and expensive and requires considerable manipulation to effect adjustment from one speed range to another.

Where planetary gear sets are employed, which is the case with the present invention, if the gear sets were arranged in the usual manner, each would reduce the speed and, if several stages were used in series, all reducing speed, a great speed reduction would result. This might not be desired and, in some cases, would not be of any use.

According to the present invention, planetary gear stages are employed but some are arranged to produce speed increase and others speed reduction so that the above mentioned drawback encountered in connection with a plurality of planetary stages is overcome and a desired speed level can be maintained while obtaining a desired number of speed changes at this general level.

The transmission can readily be arranged so that the speed changes will vary as a geometric progression so that the biggest difference between the respective speeds will occur in the highest speed ranges. It will thus be evident that the present invention proposes to obtain numerous discrete speeds from a single speed power source by simple compound and inexpensive construction and one which is reliable in operation.

The present invention proposes the provision of a multiple speed transmission in which these drawbacks and objections are eliminated.

The present invention, in particular, proposes to arrange a plurality of planetary gear sets in series with adjusting means pertaining to each planetary gear set so that a plurality of speed ratios between the input shaft and output shaft of the transmission are provided for.

Still further, the present invention has as an object the provision of a transmission having planetary gear sets providing for a positive drive connection between an input shaft and an output shaft wherein each planetary gear set is a multiple unit with means provided for selectively making one unit of each planetary gear set effective for each speed range desired.

The nature of the present invention will be better understood upon reference to the following specification taken in connection with the accompanying drawings in which:

FIGURE 3 is a fragmentary view showing a device employed in connection with controlling the planetary gear sets.

FIGURE 4 is a sectional view indicated by line 4—4 on FIGURE 3.

Figure 1:
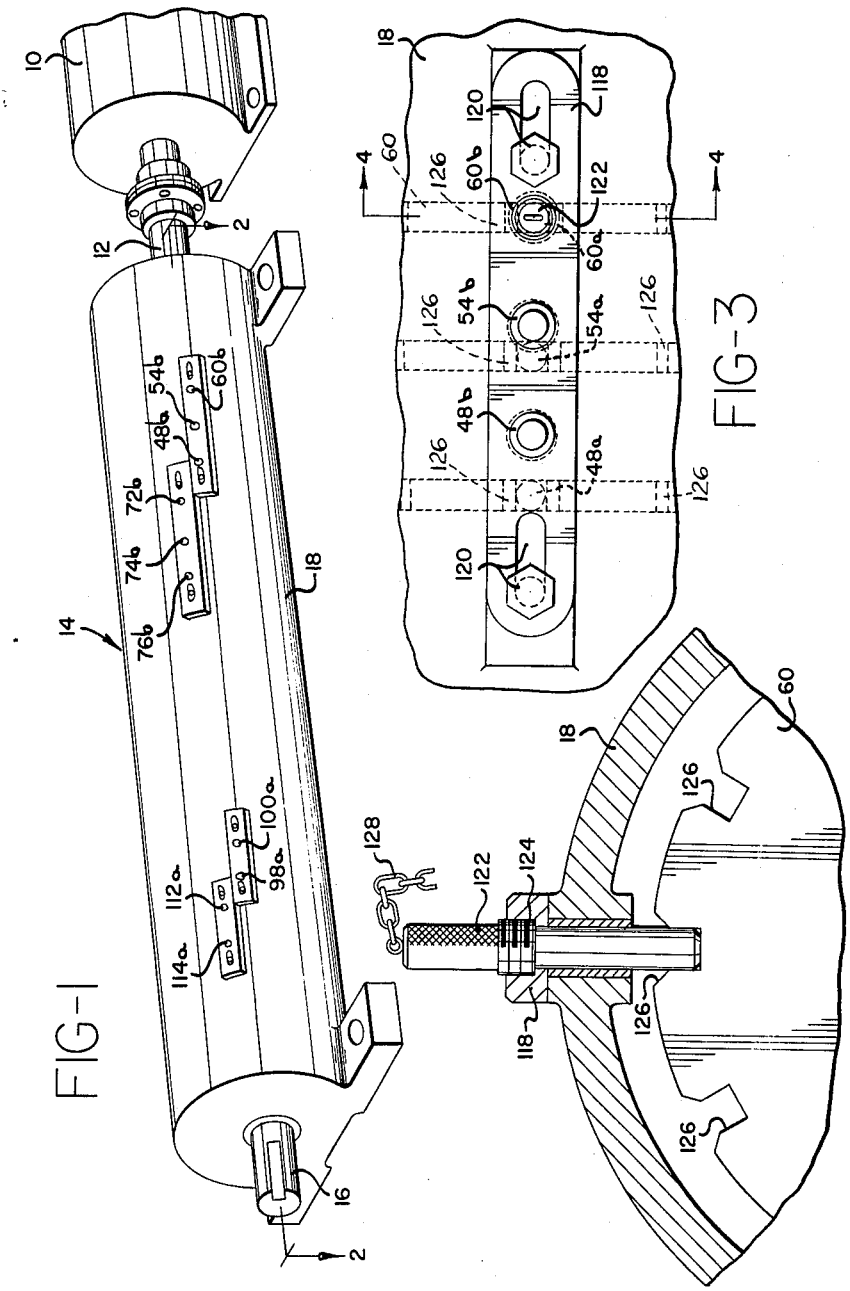
FIGURE 1 is a perspective view showing a transmission embodying my invention.

Referring to the drawings somewhat more in detail, in FIGURE 1 there is shown a drive motor 10 which is connected to input shaft 12 of the transmission according to the present invention which is generally indicated at 14. This transmission 14 has an output shaft 16 adapted for being connected with a load to be driven.

Figure 2:
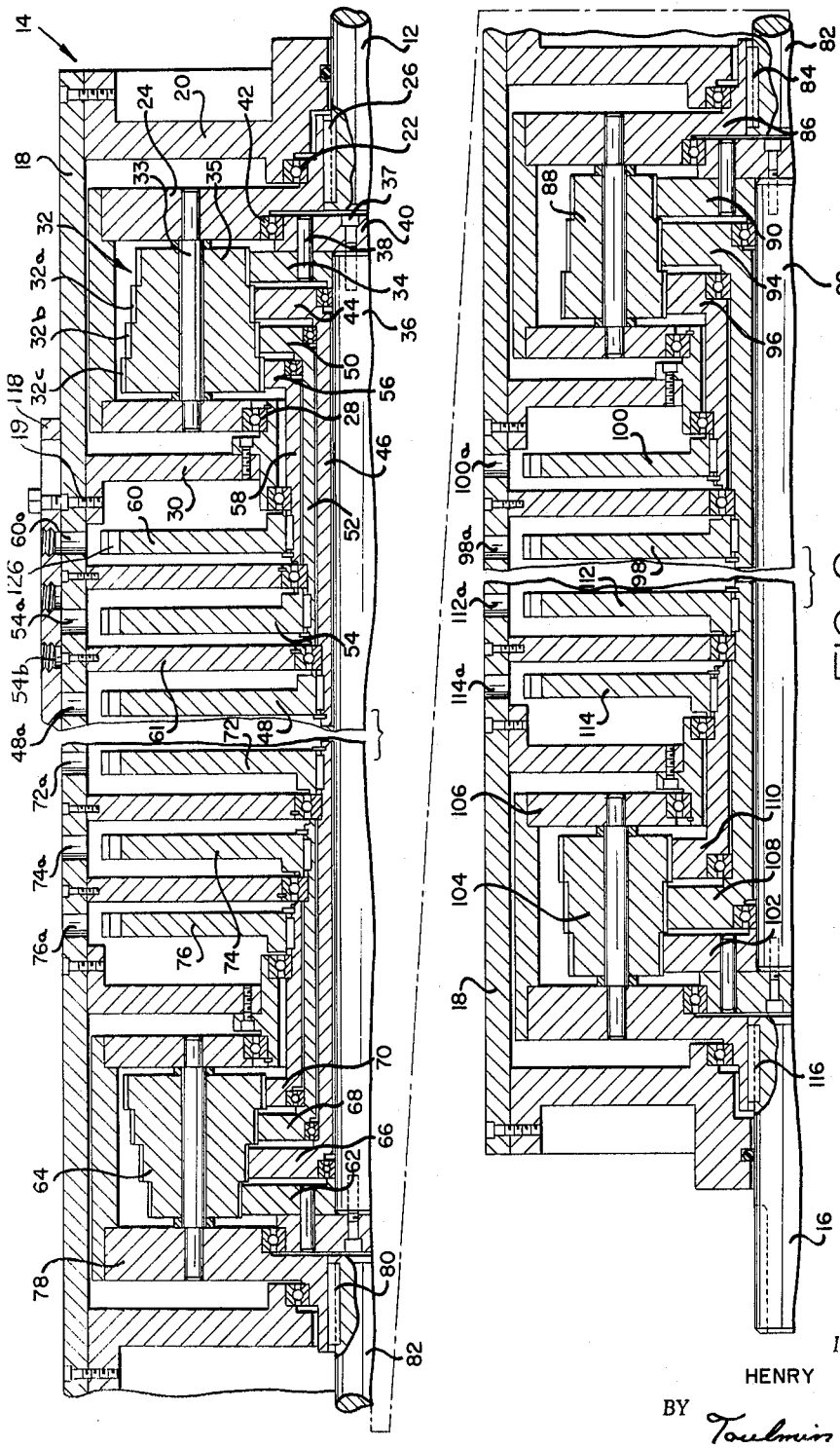
FIGURE 2 is a longitudinal sectional view indicated by line 2—2 on FIGURE 1, drawn at enlarged scale, and showing the upper half of the transmission only.

Referring now to FIGURE 2, transmission 14 comprises an outer generally cylindrical shell or casing 18. At the input shaft of the casing is an end member 20 through which the input shaft 12 extends. End member 20 and bearing 22 supports one end of a planet carrier 24 which is keyed by key 26 to input shaft 12. The other end of planet carrier 24 is journaled by a bearing 28 on a partition member 30, fixed in casing 18 by screws 19.

Mounted in planet carrier 24 are compound planet pinion means generally indicated at 32 which may comprise, for example, three compound planet pinions 32a, 32b, and 32c, which are rotatably mounted on shaft 33 fixed within carrier 24.

The right hand or smallest planet pinion means 35 engages a sun gear 34 that is fixed to an intermediate shaft 36. Sun gear 34 may, for example, be pinned by dowel 38 to a plate 40, and plate 40 being secured to intermediate shaft 36 by screws 37. Bearing 42 supports plate 40 in carrier 24.

The next largest of the planet pinion means 32a meshes with a sun gear 44 that is rigidly connected to one end of a sleeve 46. Sleeve 46 has keyed to its opposite end a disc 48.

The next largest planet pinion means 32b meshes with a sun gear 50 that is rigidly connected to one end of a sleeve 52, sleeve 52 having at its opposite end a disc member 54, keyed to sleeve 52 as shown.

Similarly, the last and largest of the pinion means 32c meshes with a sun gear 56 fixed to one end of sleeve 58, which has keyed to its opposite end a disc 60. The several sun gears referred to are supported by bearing means as illustrated and the sleeves pertaining thereto are supported by bearing means associated with the fixed partition members 61 and 30 located within the housing 18.

Each of discs 48, 54, and 60 have notches formed in the periphery thereof and these notches are adapted for being engaged by a pin or the like inserted through the apertures 48a, 54a, and 60a of the housing 18.

The discs referred to can also be arrested by frictional engagement therewith by brake shoes or bands applied to the periphery or sides and such frictional engagement with the discs may be actuated by hydraulic means.

In operation, if the input shaft is driven and none of the discs 48, 54, and 60 are held against rotation, the carrier 24 and the planet pinion means 32 therein will rotate about sun gear 34 and shaft 36 connected thereto will not be driven, however, at this time the three discs referred to will rotate.

If, however, any one of the said discs is locked against rotation, the sun gear 34 and the shaft 36 will be driven in rotation depending upon the gear ratio between the planet pinion portion 35 and the planet pinion portion pertaining to the locked disc.

Shaft 36 at its end opposite sun gear 34 has another sun gear 62 fixed thereto that meshes with the smallest planet pinion portion of a second compound planet means 64.

Planet pinion means 64 has three larger planet pinion portions meshing with other sun gears 66, 68, and 70, each of which portions is fixed to a sleeve with each sleeve having a notched disc keyed thereto.

Disc 72 pertains to sun gear 66; disc 74 pertains to sun gear 68; and disc 76 pertains to sun gear 70.

The said discs have associated therewith the apertures 72a, 74a, 76a in housing 18 which can be availed of for receiving locking pins for selectively locking any one of the said discs against rotation.

Other means, such as hydraulically operated friction plates, could be employed for selectively locking up any of the control discs.

In operation, with one of the first mentioned group of discs 48, 54, and 60 locked against rotation, sun gear 64 will be driven, and if one of discs 72, 74, and 76 is locked against rotation, the said rotation of sun gear 62 will result in rotation of carrier 78 in which compound planet pinion means 64 is rotationally supported.

Carrier 78 is keyed by a key 80 to another intermediate shaft 82 which, in turn, is keyed by a key 84 to still another planet pinion carrier 86.

Planet pinion carrier 86, in function, corresponds to carrier 24 first described.

Rotatably supported within carrier 86 is the compound planet pinion means 88 and the smallest portion of which meshes with a sun gear 90 fixed to a third intermediate shaft 92.

The two larger portions of compound planet pinion means 88 mesh with sun gears 94 and 96, respectively, which are fixed on sleeves that have the discs 98 and 100 keyed thereto.

Pertaining to the said discs are holes 98a and 100a in housing 18 through which locking pins can be inserted for selectively locking the discs.

When intermediate shaft 82 is driven and one of discs 98 and 100 is locked against rotation, power will be transmitted to sun gear 90 and into shaft 92. At its opposite end from sun gear 90, shaft 92 carries a sun gear 102 that meshes with the smallest portion of compound planet pinion means 104 rotatably supported in a carrier 106.

The two larger portions of compound planet pinion means 104 mesh with sun gears 108 and 110, respectively, that are fixed to sleeves that are keyed at their opposite ends to discs 112 and 114.

Pertaining to the said discs 112 and 114 are holes 112a and 114a in housing 18 through which locking pins can be inserted for selectively locking the discs.

When shaft 92 and sun gear 102 are driven and one of discs 112 and 114 is locked against rotation, carrier 106 will be driven and, through its keyed connection at 116 to output shaft 16, which will drive the said output shaft.

It will be understood that all of the rotating parts of the transmission will be suitably journaled as shown on ball bearings or the like to provide for efficient operation of the transmission. Since such journaling means is well known, no detailed description thereof has been given. It will be evident from the drawings, however, in what manner the bearings are utilized for supporting the rotating parts.

It will be evident from the foregoing that only one of the discs pertaining to each planetary gear set will be locked at any one time.

In order to prevent the actual locking of more than one disc of each set at any one time, I prefer to provide on casing 18 associated with each set of holes a slide plate 118, which slide plate 118 is provided with holes corresponding to the holes in the casing of the transmission. FIGURES 3 and 4 show the plate 118 that is associated with the holes 48a, 54a, and 60a of the first planetary gear set.

This plate is provided with a first hole 60b corresponding to hole 60a, a second hole 54b corresponding to hole 54a, and a third hole 48b corresponding to hole 48a. The plate 118 is slidably supported on casing 18 as by the screw and slot means 120 and it can be moved so as to bring any one only of the holes therein in register with the pertaining hole in the transmission casing. This will permit one only of the discs of the pertaining planetary gear set to be locked against rotation at any time.

In FIGURE 4 will be seen that the locking pin 122 may be threaded as at 124 in plate 18 whereby it is assured that the pin will not fall out on account of vibration. It will be seen that the pin engages one of a plurality of notches 126 in the disc pertaining thereto which, in this particular case is disc 60.

Chain means 128 may be connected to pin 122 at one end and to casing 18 at the other end so that the pin will not become lost.

There is a plate 118 associated with each of the four groups of holes as will be seen in FIGURE 1. So that one only of the discs of each of the four groups of discs can be locked against rotation at any one time.

In this manner, the transmission as illustrated can provide for 36 different speeds of rotation of output shaft 16 for a given speed of rotation of input shaft 12.

It will be evident that each planetary gear set could comprise two or more individual planetary gear units so that as many different speeds could be had as desired. In the particular transmission illustrated wherein the first two planetary gear sets each comprise three units, in addition to the output planetary gear unit, and the last two planetary gear sets each comprise two planetary gear units, in addition to the output planetary gear unit 36 different output speeds are available, but this could readily be increased to 81 output speeds merely by making the last two planetary gear sets so that each consisted of three planetary gear units in addition to the output unit thereof.

In the particular example illustrated, the first planetary gear set, which is to say the planetary gear set nearest the input shaft, produces a speed decrease from input shaft 12 to intermediate shaft 36. The next planetary gear set will produce an increase of speed from intermediate shaft 36 to intermediate shaft 82; the third planetary gear set will produce a decrease of speed from intermediate shaft 82 to intermediate shaft 92, and the last planetary gear set, which is keyed to output shaft 16, will produce an increase of speed from intermediate shaft 92 to output shaft 16.

The particular speeds that can be obtained at the output shaft end of the transmission will be determined by the relative sizes of the planet pinions.

It will be appreciated that a wide range of choices with respect to the gear sizes of the planetary gear sets is available so that the transmission could be designed to obtain substantially any speed range desired for output shaft 16 with substantially any ratio between succeeding steps within the speed range.

It will be understood that this invention is susceptible to modification in order to adapt it to different usages and conditions; and accordingly, it is desired to comprehend such modifications within this invention as may fall within the scope of the appended claim.

I claim:

In a multiple speed power transmission; a tubular casing, two pairs of planetary gear units serially arranged within said casing, each said planetary gear unit comprising a first sun gear and a plurality of other sun gears all independently rotatable, compound planetary pinion means meshing with said sun gears, a carrier rotatably supporting said compound planetary pinion means, one of said first sun gear and the said carrier of each gear unit forming the input member thereof and the other forming the output member thereof, an input shaft connected to the input member of the first gear unit at one end of the casing, an output shaft connected to the output member of the last gear unit at the other end of said casing, each gear unit following the first thereof having its input member connected with the output member of the next preceding unit, a sleeve connected to each of said other sun gears, a control disc connected to each said sleeve, each disc being peripherally notched, an aperture in the casing coplanar with each said disc, and pin means insertable through said apertures for engaging the notches in said disc for selectively locking the said discs against rotation, there being means pertaining to said casing for preventing the introduction of pin means into more than one of the apertures pertaining to each gear unit, the control discs pertaining to each pair of units being arranged between the respective units of the pertaining pair, in a given pair of said units one will increase and the other will decrease the drive ratio between said input and output shafts to provide for a plurality of speed ratios between said input and output shafts within any predetermined range.

References Cited by the Examiner

UNITED STATES PATENTS

| | | | |
|---|---|---|---|
| 1,405,391 | 2/1922 | Blanc-Garin | 74—766 |
| 1,592,328 | 7/1926 | Beckman | 74—766 |
| 1,909,099 | 5/1933 | Gessner | 74—768 |
| 1,910,180 | 5/1933 | Poncelet | 74—757 |
| 2,095,207 | 10/1937 | Walter | 74—768 |
| 2,249,441 | 7/1941 | Sussman | 74—801 |
| 2,440,625 | 4/1948 | Wiemer | 74—766 |
| 2,486,242 | 10/1949 | Ashton | 74—801 |
| 2,564,271 | 8/1951 | Millns | 74—785 |
| 2,777,337 | 1/1957 | Hultin | 74—767 |
| 2,869,400 | 1/1959 | Langdon | 74—740 |
| 2,929,272 | 3/1960 | Miller | 74—759 |

FOREIGN PATENTS

| | | |
|---|---|---|
| 332,789 | 7/1930 | Great Britain. |
| 916,462 | 12/1946 | France. |

DAVID J. WILLIAMOWSKY, *Primary Examiner.*

DON A. WAITE, *Examiner.*

T. C. PERRY, H. B. ROCKMAN, *Assistant Examiners.*